US011944241B1

(12) United States Patent
Thelander

(10) Patent No.: US 11,944,241 B1
(45) Date of Patent: Apr. 2, 2024

(54) HANDS-FREE TOILET PAPER DISPENSER

(71) Applicant: Kristen Thelander, Houston, TX (US)

(72) Inventor: Kristen Thelander, Houston, TX (US)

( * ) Notice: Subject to any disclaimer, the term of this patent is extended or adjusted under 35 U.S.C. 154(b) by 206 days.

(21) Appl. No.: 17/567,968

(22) Filed: Jan. 4, 2022

(51) Int. Cl.
*A47K 10/36* (2006.01)
*A47K 10/32* (2006.01)
*B05B 9/04* (2006.01)
*B05B 12/02* (2006.01)

(52) U.S. Cl.
CPC ............ *A47K 10/36* (2013.01); *B05B 9/0403* (2013.01); *B05B 12/02* (2013.01); *A47K 2010/322* (2013.01); *A47K 2010/3233* (2013.01); *A47K 2010/3668* (2013.01)

(58) Field of Classification Search
CPC .............. A47K 10/36; A47K 2010/322; A47K 2010/3233; A47K 2010/3668; B05B 9/0403; B05B 12/02
USPC .......................................................... 221/244
See application file for complete search history.

(56) References Cited

U.S. PATENT DOCUMENTS 4,666,099 A * 5/1987 Hoffman ............ A47K 10/3687 250/221
4,791,251 A * 12/1988 Carter ....................... A61L 9/12 222/638
5,598,987 A * 2/1997 Wachowicz ....... B65H 35/0006 242/905
6,321,950 B1 * 11/2001 Muis .................... B65D 83/384 222/321.8
6,883,787 B2 * 4/2005 Allen ........................ A61L 9/04 239/289
7,527,215 B1 * 5/2009 Siddiqui ................ A47K 10/36 242/598.5
8,651,003 B1 * 2/2014 Vercellone ......... A47K 10/3606 83/648
8,763,948 B1 * 7/2014 Holowaty ............. A47K 10/36 242/563.2
9,370,283 B2 6/2016 Fellhoelter
9,907,441 B2 3/2018 Osborne, Jr.
D824,188 S 7/2018 Wiles
10,149,579 B2 * 12/2018 Goltz ..................... A47K 10/36
11,230,452 B1 * 1/2022 Razai ................... B65H 16/106
2002/0033405 A1 * 3/2002 Gergek ............. A47K 10/3618 225/96
2006/0157496 A1 * 7/2006 Tagliareni ............ A47K 10/422 221/63
2007/0080255 A1 * 4/2007 Witt ....................... A47K 10/36 242/563.2

(Continued)

FOREIGN PATENT DOCUMENTS

EP 2143575 A1 * 1/2010 ............... A61L 9/03
WO 9417715 8/1994

*Primary Examiner* — Rakesh Kumar

(57) ABSTRACT

The hands-free toilet paper dispenser comprises a toilet paper holder, a sheet feeder mechanism, a motion sensor, and a fragrance dispenser. The hands-free toilet paper dispenser may mount on a wall of a bathroom adjacent to a toilet. The hands-free toilet paper dispenser may hold a roll of toilet paper on the toilet paper holder. The sheet feeder mechanism may be adapted to dispense one or more sheets of toilet paper when a user's hand passes in front of the motion sensor without having to touch the hands-free toilet paper dispenser. The fragrance dispenser may be operable to dispense a fragrance into the bathroom to mask odors resulting from use of the toilet.

16 Claims, 5 Drawing Sheets

(56) References Cited

U.S. PATENT DOCUMENTS

| | | | | |
|---|---|---|---|---|
| 2007/0204388 | A1* | 9/2007 | Zyskowski | A61L 9/14<br>4/228.1 |
| 2010/0086448 | A1* | 4/2010 | Faber | A47G 7/06<br>422/120 |
| 2011/0226887 | A1* | 9/2011 | Marrs | A47K 10/34<br>242/564 |
| 2012/0248136 | A1* | 10/2012 | Meyers | A61L 9/122<br>221/199 |

* cited by examiner

HANDS-FREE TOILET PAPER DISPENSER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of bathroom accessories, more specifically, a hands-free toilet paper dispenser.

SUMMARY OF INVENTION

The hands-free toilet paper dispenser comprises a toilet paper holder, a sheet feeder mechanism, a motion sensor, and a fragrance dispenser. The hands-free toilet paper dispenser may mount on a wall of a bathroom adjacent to a toilet. The hands-free toilet paper dispenser may hold a roll of toilet paper on the toilet paper holder. The sheet feeder mechanism may be adapted to dispense one or more sheets of toilet paper when a user's hand passes in front of the motion sensor without having to touch the hands-free toilet paper dispenser. The fragrance dispenser may be operable to dispense a fragrance into the bathroom to mask odors resulting from use of the toilet.

An object of the invention is to provide access to a roll of toilet paper within a bathroom at a wall-mounted location adjacent to a toilet.

Another object of the invention is to dispense one or more sheets of toilet paper when a user's hand passes in from of a motion sensor.

A further object of the invention is to dispense a fragrance into the bathroom.

Yet another object of the invention is to provide easy access for replacing the fragrance reservoir and one or more batteries that power the invention.

These together with additional objects, features and advantages of the hands-free toilet paper dispenser will be readily apparent to those of ordinary skill in the art upon reading the following detailed description of the presently preferred, but nonetheless illustrative, embodiments when taken in conjunction with the accompanying drawings.

In this respect, before explaining the current embodiments of the hands-free toilet paper dispenser in detail, it is to be understood that the hands-free toilet paper dispenser is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the hands-free toilet paper dispenser.

It is therefore important that the claims be regarded as including such equivalent construction insofar as they do not depart from the spirit and scope of the hands-free toilet paper dispenser. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
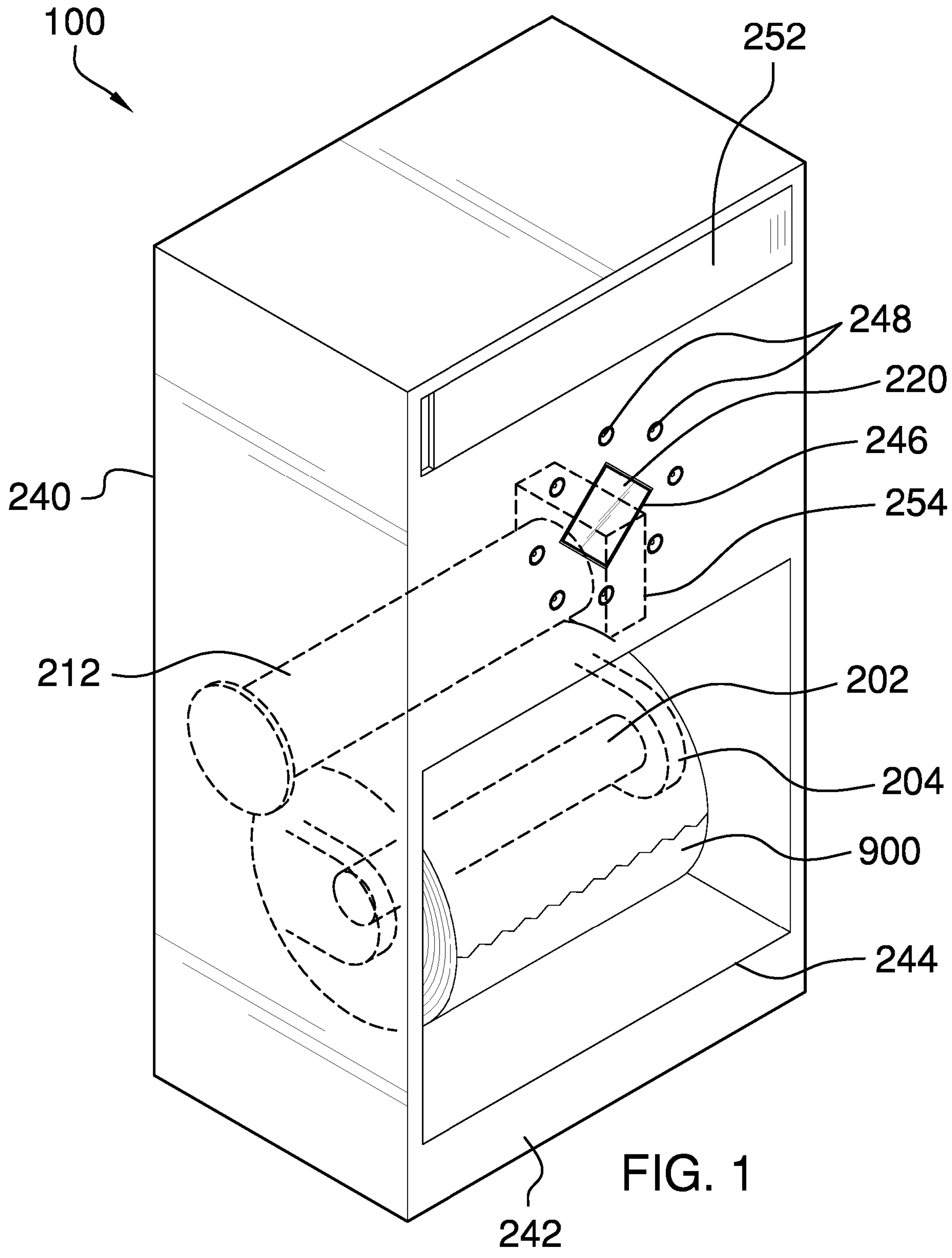
FIG. 1 is an isometric view of an embodiment of the disclosure.
Figure 2:
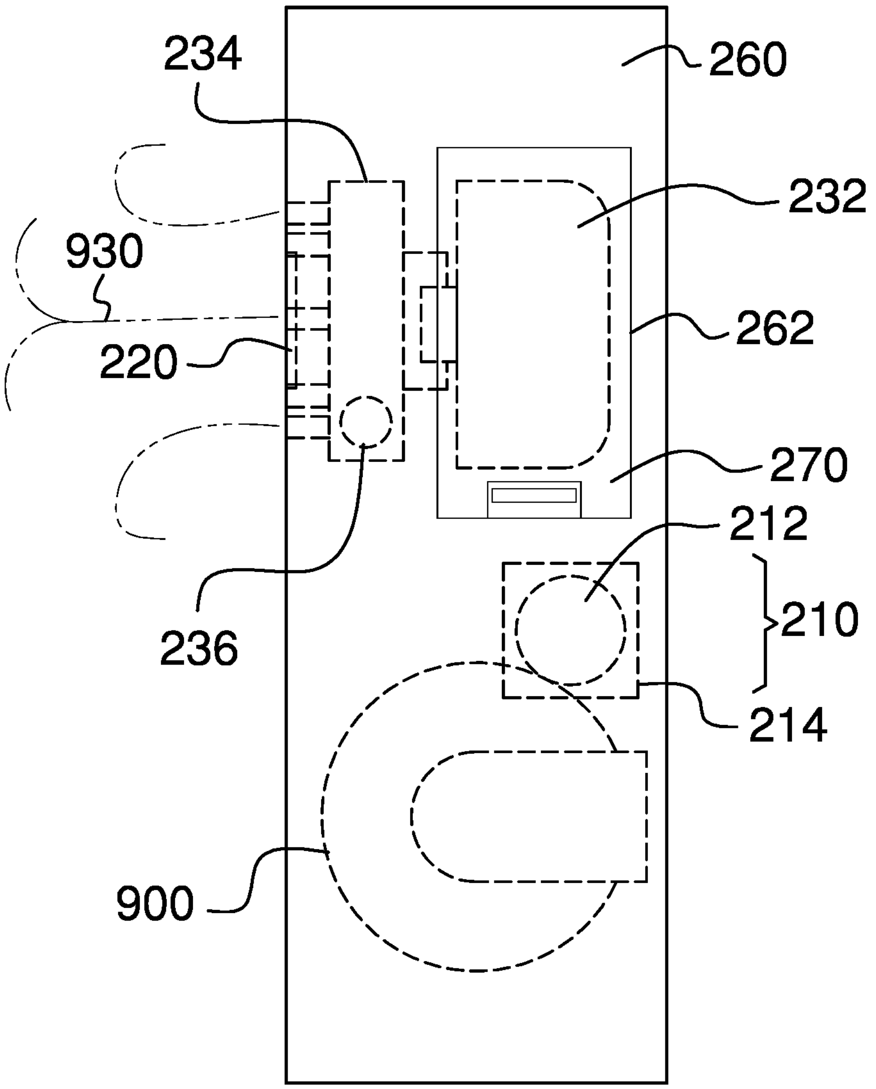
FIG. 2 is a side detail view of an embodiment of the disclosure.
Figure 3:
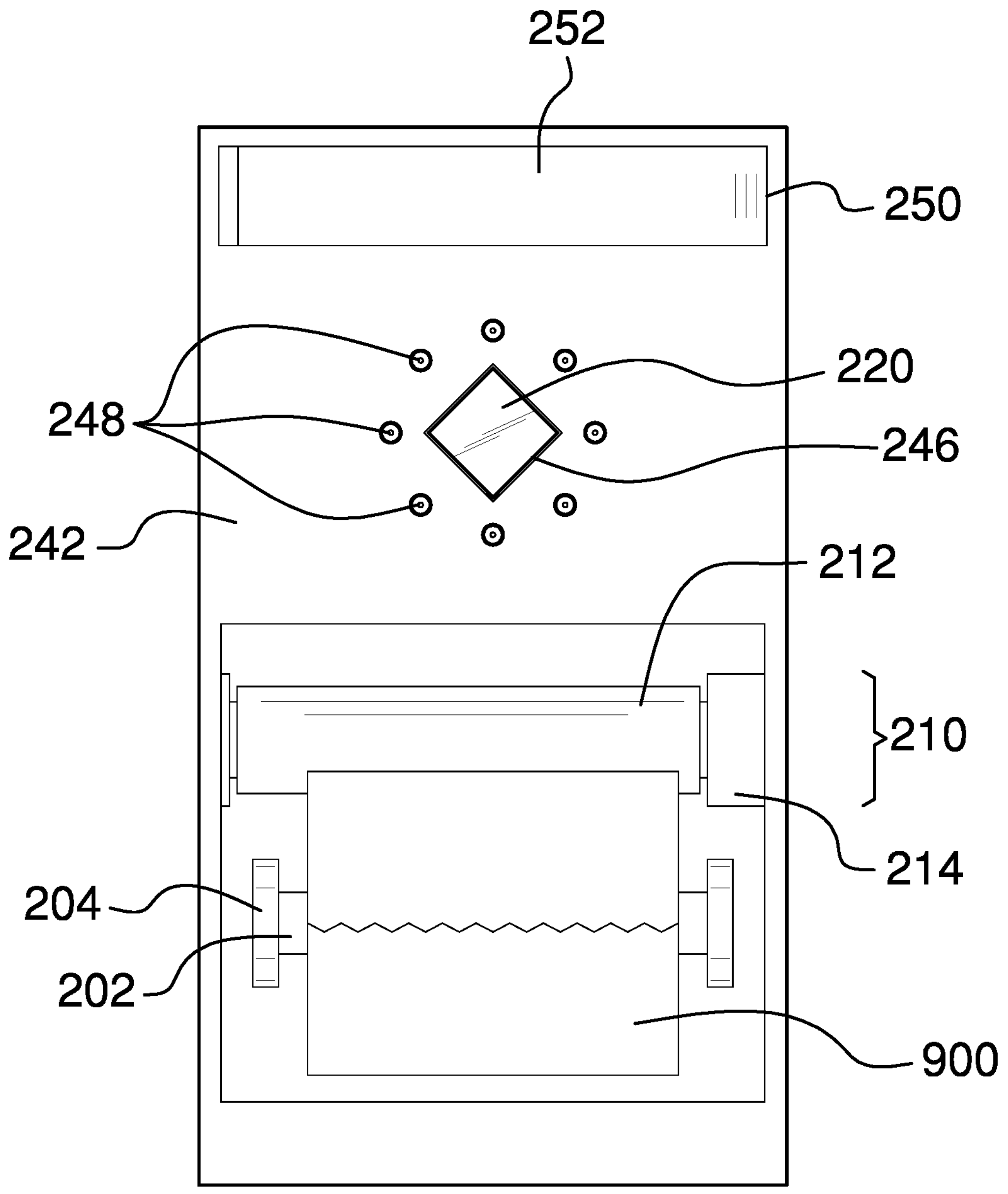
FIG. 3 is a front view of an embodiment of the disclosure.
Figure 4:
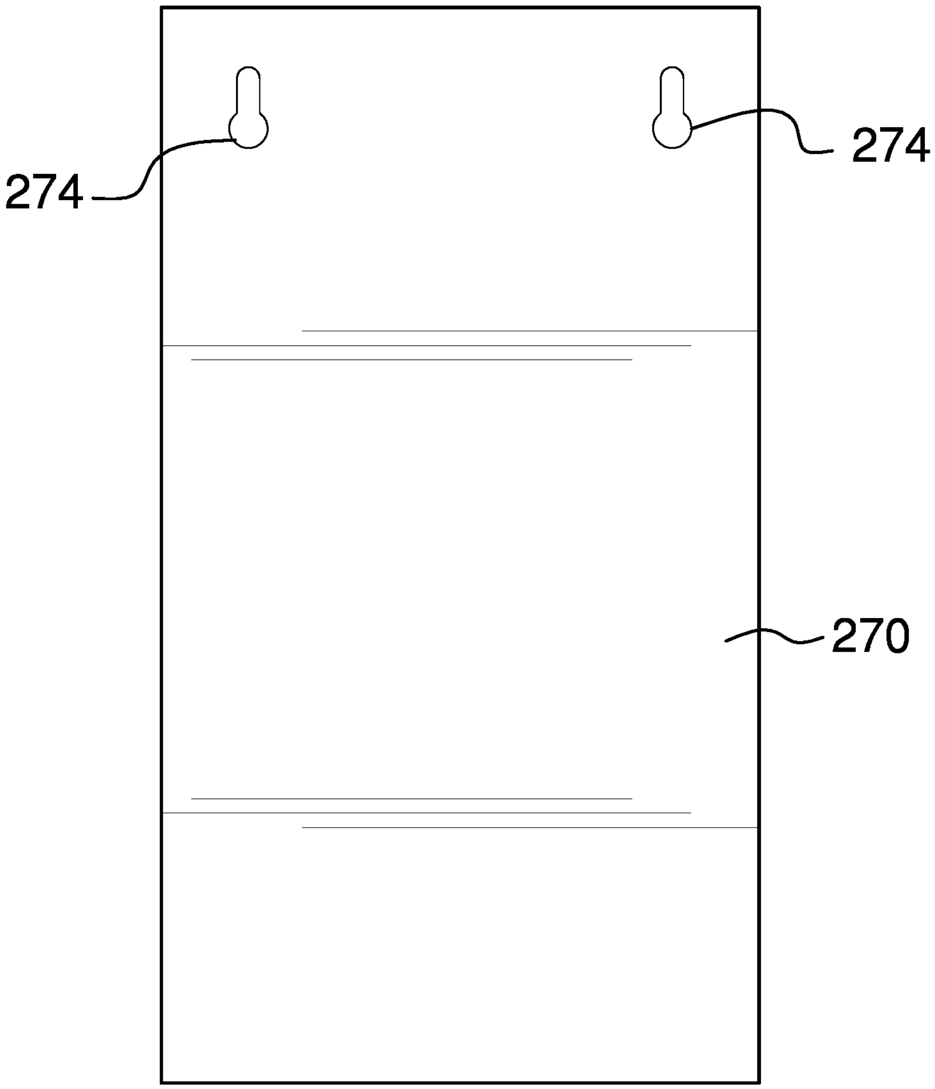
FIG. 4 is a rear view of an embodiment of the disclosure.
Figure 5:
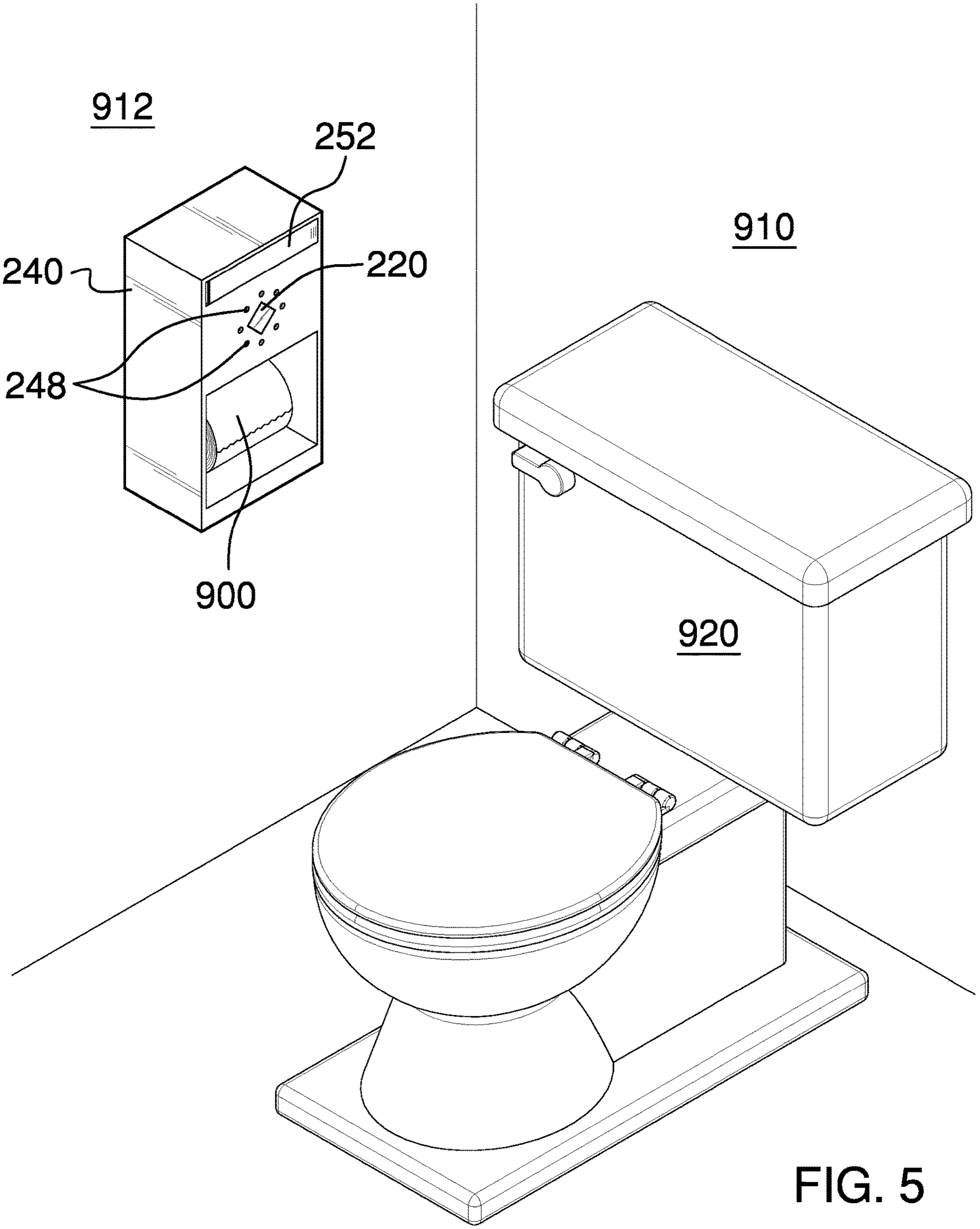
FIG. 5 is an in-use view of an embodiment of the disclosure.

Detailed reference will now be made to a first potential embodiment of the disclosure, which is illustrated in FIGS. 1 through 5.

The hands-free toilet paper dispenser 100 (hereinafter invention) comprises a toilet paper holder 204, a sheet feeder mechanism 210, a motion sensor 220, and a fragrance dispenser. The invention 100 may mount on a wall 912 of a bathroom 910 adjacent to a toilet 920. The invention 100 may hold a roll of toilet paper 900 on the toilet paper holder 204. The sheet feeder mechanism 210 may be adapted to dispense one or more sheets of toilet paper when a user's hand passes in front of the motion sensor 220 without having to touch the invention 100. The fragrance dispenser may be operable to dispense a fragrance 930 into the bathroom 910 to mask odors resulting from use of the toilet 920.

The toilet paper holder 204 may be located within a toilet paper compartment on the front of an enclosure 240 and may be accessible via a toilet paper access aperture 244. The toilet paper holder 204 may be operable to hold a toilet paper core 202 and the roll of toilet paper 900 situated on the toilet paper core 202. The toilet paper core 202 may pass through the center hole of the roll of toilet paper 900 and the toilet paper core 202 may be detachably coupled to the toilet paper holder 204.

The toilet paper core 202 may be removed from the toilet paper holder 204 to replace the roll of toilet paper 900.

The sheet feeder mechanism 210 may rotate the roll of toilet paper 900 such that the one or more sheets of toilet paper may be dispensed at the front of the enclosure 240. The sheet feeder mechanism 210 may comprise a toilet paper roller 212 and a roller motor 214.

The toilet paper roller 212 may be a horizontally-oriented cylinder that may contact the roll of toilet paper 900. One end of the toilet paper roller 212 may be coupled to the roller motor 214 such that the toilet paper roller 212 rotates when the roller motor 214 is energized.

The roller motor 214 may convert electrical energy into mechanical energy. The roller motor 214 may cause rotational motion of the toilet paper roller 212 when the electrical energy is applied to the roller motor 214. The roller motor 214 may be energized when the motion sensor 220 applies a first electrical potential to the roller motor 214 and may be deenergized when the motion sensor 220 stops applying the first electrical potential from the roller motor 214.

In some embodiments, the sheet feeder mechanism 210 may be free to move vertically within the enclosure 240 such that the toilet paper roller 212 may drop to remain in contact with the roll of toilet paper 900 as the roll of toilet paper 900 is depleted. As a non-limiting example, the sheet feeder mechanism 210 may ride in one or more tracks located on the inside side walls of the enclosure 240 and may be pulled downwards by gravity. As an alternative non-limiting example, the sheet feeder mechanism 210 may be spring-loaded such that the toilet paper roller 212 is constantly pushed into contact with the roll of toilet paper 900.

The motion sensor 220 may be located within the enclosure 240 behind a front panel 242 where the motion sensor 220 has an unobstructed view out of the enclosure 240 via a motion sensor aperture 246. The motion sensor 220 may be adapted to detect the presence of the user's hand in front of the motion sensor 220. Responsive to detecting the user's hand, the motion sensor 220 may energize the roller motor 214 for a predetermined roller time interval. Energizing the roller motor 214 for the predetermined roller time interval may correlate with the sheet feeder mechanism 210 dispensing a predetermined count of sheets from the roll of toilet paper 900. In a preferred embodiment, the motion sensor 220 may be a passive IR sensor.

The fragrance dispenser may comprise a fragrance reservoir 232, a pump 234, and a pump motor 236. The fragrance reservoir 232 may be a container holding a supply of the fragrance 930. The fragrance reservoir 232 may be replaceable and/or refillable. The fragrance reservoir 232 may be located in a fragrance compartment within the enclosure 240 and may be accessible at a side panel 260 via a fragrance access aperture 262. A fragrance access door 270 may cover the fragrance access aperture 262 when not replacing the fragrance reservoir 232.

The pump 234 may move the fragrance 930 from the fragrance reservoir 232 to one or more fragrance apertures 248. The pump 234 may be electromechanical and may comprise the pump motor 236 that may be energized by the application of a second electrical potential to the pump 234. As non-limiting examples, the pump 234 may move the fragrance 930 by applying rotary motion, reciprocating motion, linear motion, or a combination thereof to one or more gears, screws, pistons, shuttle blocks, vanes, diaphragms, plungers, chains, ropes, impellers, or combinations thereof. In some embodiments, the one or more fragrance apertures 248 may comprise atomizing nozzles that release the fragrance 930 as a mist.

The motion sensor 220 may be adapted to trigger in the presence of the user's hand in front of the motion sensor 220. Once triggered, the motion sensor 220 may energize the pump motor 236 and dispense the fragrance 930 into the bathroom 910 to mask odors resulting from use of the toilet 920. The motion sensor 220 may hold the pump motor 236 energized for a predetermined pump time interval and may then deenergize the pump motor 236. Holding the pump motor 236 energized for the predetermined pump time interval may correlate with the release of a predetermined amount of fragrance.

In some embodiments, the motion sensor 220 may delay by a predetermined delay time interval between triggering and energizing the pump motor 236. The predetermined delay time interval may be adapted to provide time for a user to leave the bathroom 910 prior to dispensing the fragrance 930.

In some embodiments, the motion sensor 220 may periodically and repeatedly energize the pump motor 236 even without the motion sensor 220 triggering. Periodic energization of the pump motor 236 may assure that a pleasant odor is sustained in the bathroom 910. The interval between repeated release of the fragrance 930 may range from a several minutes to several hours.

The invention 100 may be battery-powered. One or more batteries may reside within a battery compartment that is accessible through a battery compartment aperture 250. The battery compartment may be covered by a battery access door 252 when not replacing the one or more batteries. The one or more batteries may comprise one or more energy-storage devices. The one or more batteries may be a source of electrical energy to operate the motion sensor 220, the roller motor 214, and the pump motor 236. The one or more batteries may be rechargeable and/or replaceable.

The enclosure 240 may be configured to hang on the wall 912 of the bathroom 910. One or more mounting apertures 274 located on a rear panel 272 may be operable to removably couple the enclosure 240 to the wall 912 using mounting hardware such as screws.

In use, the invention 100 may be mounted on a wall 912 of a bathroom 910 adjacent to a toilet 920. The user may dispense one or more sheets of toilet paper from a roll of toilet paper 900 held within the enclosure 240 by placing the user's hand in front of the motion sensor 220. Responsive to sensing the user's hand, the motion sensor 220 may energize the roller motor 214 to turn the toilet paper roller 212 and dispense the one or more sheets of toilet paper. The motion sensor 220 may also energize the pump motor 236 to spray a fragrance 930, either as a result of sensing the user's hand or periodically throughout the day.

Definitions

As used in this disclosure, an "aperture" may be an opening in a surface. Aperture may be synonymous with hole, slit, crack, gap, slot, or opening.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used herein, the words “couple”, “couples”, “coupled” or “coupling”, may refer to connecting, either directly or indirectly, and does not necessarily imply a mechanical connection.

As used in this disclosure, a “cylinder” may be a geometric structure defined by two identical flat and parallel ends, also commonly referred to as bases, which are circular in shape and connected with a single curved surface which may be referred to as the face. The axis of the cylinder is formed by the straight line that connects the center of each of the two identical flat and parallel ends of the cylinder. Unless otherwise stated within this disclosure, the term cylinder specifically indicates a right cylinder which is defined as a cylinder wherein the curved surface perpendicularly intersects with the two identical flat and parallel ends.

As used herein, “energize” and/or “energization” may refer to the application of an electrical potential to a system or subsystem.

As used herein, “front” may indicate the side of an object that is closest to a forward direction of travel under normal use of the object or the side or part of an object that normally presents itself to view or that is normally used first. “Rear” or “back” may refer to the side that is opposite the front.

As used in this disclosure, “horizontal” may be a directional term that refers to a direction that is perpendicular to the local force of gravity. Unless specifically noted in this disclosure, the horizontal direction is always perpendicular to the vertical direction.

As used herein, “motion sensor” may refer to an electrical device that detects motion across the sensor’s field of view. Motion sensors may be classified as active or passive based upon whether they emit a signal (active) or not (passive). The motion sensor may act as an electrical switch and may complete an electrical circuit in the presence of detected motion.

As used in this disclosure, a “motor” may refer to a device that transforms energy from an external power source into mechanical energy.

As used herein, “mounting hardware” may refer to mechanical devices that are used to attach one object to another, including devices whose only purpose is to improve aesthetics. As non-limiting examples, mounting hardware may include screws, nuts, bolts, washers, rivets, crossbars, hooks, collars, nipples, cams, standoffs, knobs, caps, plates, rails, lips, and brackets.

As used in this disclosure, a “pump” may be a mechanical or electromechanical device that uses suction or pressure to raise or move fluids, compress fluids, or force a fluid into an inflatable object. As non-limiting examples, fluids may include both liquids, such as water, and gases, such as air.

As used herein, “reservoir” may refer to a container or containment system that is configured to store a liquid, gas, or gel.

As used in this disclosure, a “roll” may be a method of storing paper or other sheeting in a cylindrical structure such that creases are not formed within the paper or sheeting. To form the roll, the paper or other sheeting material is curved over itself around a center axis such that a spiral is formed when the roll is viewed from the end of the cylindrical structure.

As used in this disclosure, a “sensor” may be a device that quantitatively measures a physical stimulus.

As used in this disclosure, a “spray” may be a plurality of liquid drops projected from a nozzle.

As used in this disclosure, a “spring” may be a device that is used to store mechanical energy. This mechanical energy will often be stored by deforming an elastomeric material that is used to make the device, by the application of a torque to a rigid structure, or by a combination thereof. In some embodiments, the rigid structure to which torque is applied may be composed of metal or plastic.

As used in this disclosure, “vertical” may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A hands-free toilet paper dispenser comprising:

a toilet paper holder, a sheet feeder mechanism, a motion sensor, and a fragrance dispenser;

wherein the hands-free toilet paper dispenser mounts on a wall of a bathroom adjacent to a toilet;

wherein the hands-free toilet paper dispenser holds a roll of toilet paper on the toilet paper holder;

wherein the sheet feeder mechanism is adapted to dispense one or more sheets of toilet paper when a user’s hand passes in front of the motion sensor without having to touch the hands-free toilet paper dispenser;

wherein the fragrance dispenser is operable to dispense a fragrance into the bathroom;

wherein the sheet feeder mechanism comprises a toilet paper roller and a roller motor;

wherein the roller motor is energized when the motion sensor applies a first electrical potential to the roller motor and is deenergized when the motion sensor stops applying the first electrical potential from the roller motor;

wherein the fragrance dispenser comprises a fragrance reservoir, a pump, and a pump motor;

wherein the pump moves the fragrance from the fragrance reservoir to a plurality of fragrance apertures;

wherein the pump is electromechanical and comprises the pump motor that is energized by the application of a second electrical potential to the pump;

wherein the plurality of fragrance apertures comprise atomizing nozzles that release the fragrance as a mist;

wherein the plurality of fragrance apertures form a circular pattern around the motion sensor;

wherein both the plurality of fragrance apertures and the motion sensor are positioned above a toilet paper access aperture on a front of an enclosure.

2. The hands-free toilet paper dispenser according to claim 1 wherein the toilet paper holder is located within a toilet paper compartment on the front of the enclosure and is accessible via the toilet paper access aperture;

wherein the toilet paper holder is operable to hold a toilet paper core and the roll of toilet paper situated on the toilet paper core;

wherein the toilet paper core passes through the center hole of the roll of toilet paper and the toilet paper core is detachably coupled to the toilet paper holder.

3. The hands-free toilet paper dispenser according to claim 2 wherein the toilet paper core is removed from the toilet paper holder to replace the roll of toilet paper.

4. The hands-free toilet paper dispenser according to claim 2 wherein the sheet feeder mechanism rotates the roll of toilet paper such that the one or more sheets of toilet paper are dispensed at the front of the enclosure.

5. The hands-free toilet paper dispenser according to claim 4 wherein the toilet paper roller is a horizontally-oriented cylinder that contacts the roll of toilet paper;

wherein one end of the toilet paper roller is coupled to the roller motor such that the toilet paper roller rotates when the roller motor is energized.

6. The hands-free toilet paper dispenser according to claim 5 wherein the roller motor converts electrical energy into mechanical energy;

wherein the roller motor causes rotational motion of the toilet paper roller when the electrical energy is applied to the roller motor.

7. The hands-free toilet paper dispenser according to claim 6 wherein the sheet feeder mechanism is free to move vertically within the enclosure such that the toilet paper roller drops to remain in contact with the roll of toilet paper as the roll of toilet paper is depleted.

8. The hands-free toilet paper dispenser according to claim 6 wherein the motion sensor is located within the enclosure behind a front panel where the motion sensor has an unobstructed view out of the enclosure via a motion sensor aperture;

wherein the motion sensor is adapted to detect the presence of the user's hand in front of the motion sensor;

wherein responsive to detecting the user's hand, the motion sensor energizes the roller motor for a predetermined roller time interval;

wherein energizing the roller motor for the predetermined roller time interval correlates with the sheet feeder mechanism dispensing a predetermined count of sheets from the roll of toilet paper.

9. The hands-free toilet paper dispenser according to claim 8 wherein the motion sensor is a passive IR sensor.

10. The hands-free toilet paper dispenser according to claim 8 wherein the fragrance reservoir is a container holding a supply of the fragrance;

wherein the fragrance reservoir is replaceable and/or refillable;

wherein the fragrance reservoir is located in a fragrance compartment within the enclosure and is accessible at a side panel via a fragrance access aperture;

wherein a fragrance access door covers the fragrance access aperture when not replacing the fragrance reservoir.

11. The hands-free toilet paper dispenser according to claim 10 wherein the pump moves the fragrance by at least one of applying rotary motion, reciprocating motion, linear motion, or a combination thereof to one or more gears, screws, pistons, shuttle blocks, vanes, diaphragms, plungers, chains, ropes, impellers, or combinations thereof.

12. The hands-free toilet paper dispenser according to claim 10 wherein the motion sensor is adapted to trigger in the presence of the user's hand in front of the motion sensor;

wherein once triggered, the motion sensor energizes the pump motor and dispenses the fragrance into the bathroom;

wherein the motion sensor holds the pump motor energized for a predetermined pump time interval and then deenergizes the pump motor;

wherein holding the pump motor energized for the predetermined pump time interval correlates with the release of a predetermined amount of fragrance.

13. The hands-free toilet paper dispenser according to claim 12 wherein the motion sensor delays by a predetermined delay time interval between triggering and energizing the pump motor;

wherein the predetermined delay time interval is adapted to provide time for a user to leave the bathroom prior to dispensing the fragrance.

14. The hands-free toilet paper dispenser according to claim 12 wherein the motion sensor periodically and repeatedly energizes the pump motor even without the motion sensor triggering;

wherein periodic energization of the pump motor assures that a pleasant odor is sustained in the bathroom.

15. The hands-free toilet paper dispenser according to claim 12 wherein the hands-free toilet paper dispenser is battery-powered;

wherein one or more batteries reside within a battery compartment that is accessible through a battery compartment aperture;

wherein the battery compartment is covered by a battery access door when not replacing the one or more batteries;

wherein the one or more batteries comprise one or more energy-storage devices;

wherein the one or more batteries are a source of electrical energy to operate the motion sensor, the roller motor, and the pump motor;

wherein the one or more batteries are rechargeable and/or replaceable.

16. The hands-free toilet paper dispenser according to claim 15 wherein the enclosure is configured to hang on the wall of the bathroom;

wherein one or more mounting apertures located on a rear panel are operable to removably couple the enclosure to the wall using mounting hardware.

* * * * *